United States Patent [19]

Christell

[11] Patent Number: 4,471,110
[45] Date of Patent: Sep. 11, 1984

[54] POLYAMIDE OF DISULFONATED DIAMINE AND PERMSELECTIVE MEMBRANE THEREOF

[75] Inventor: Lance A. Christell, Wilmington, Del.

[73] Assignee: E. I. DuPont de Nemours and Company, Wilmington, Del.

[21] Appl. No.: 404,373

[22] Filed: Aug. 2, 1982

[51] Int. Cl.³ .............................................. C08G 69/32
[52] U.S. Cl. ................................ 528/337; 210/500.2; 428/35; 528/172; 528/173; 528/183
[58] Field of Search ............... 528/337, 172, 173, 183; 210/500.2; 428/35

[56] References Cited

U.S. PATENT DOCUMENTS

| | | | |
|---|---|---|---|
| 3,567,632 | 3/1971 | Richter et al. | 210/23 |
| 3,993,625 | 11/1976 | Kurihara et al. | 260/47 CP |
| 4,086,215 | 4/1978 | Kurihara et al. | 260/78 R |
| 4,162,346 | 7/1979 | Jones et al. | 528/337 |

FOREIGN PATENT DOCUMENTS 2729847 1/1978 Fed. Rep. of Germany .
54-86596 7/1979 Japan .

OTHER PUBLICATIONS

Chemical Abstracts, 91:75444k, Sep. 3, 1979.
Chemical Abstracts, 83:444013z, Aug. 11, 1975.
Chemical Abstracts, 80:121812b, Jun. 3, 1974.

Primary Examiner—Harold D. Anderson

[57] ABSTRACT

Aromatic polyamides which include units based on disulfonated aromatic diamines, the sulfonate groups being present as sulfonic acid groups or alkali metal, alkaline earth metal, transition metal, aluminum, ammonium or lower alkyl quaternary ammonium salts thereof, are provided. Permselective membranes fabricated from such polyamides are also provided. The membranes are suitable for reverse osmosis, especially for purification of water.

16 Claims, No Drawings

POLYAMIDE OF DISULFONATED DIAMINE AND PERMSELECTIVE MEMBRANE THEREOF

BACKGROUND OF THE INVENTION

Asymmetric membranes for use in a variety of purification operations have long been known. Permeation selective or permselective membranes preferentially pass certain components of liquid mixtures while retaining other components. In reverse osmosis membranes, a hydrostatic pressure in excess of the equilibrium osmotic pressure of the liquid mixture or solution is applied to the liquid to force the more permeable components, usually water, through the membrane in preference to the less permeable components, such as a salt, contrary to the normal osmotic flow. In recent years, substantial effort has been directed at desalination of brackish water and sea water on a practical scale. It has been difficult to find permselective barriers that simultaneously exhibit high permeability to water (high water flux), low permeability to dissolved ions (low salt passage), high mechanical strength in order to survive high operating pressures, commonly of the order of 70 kg/cm$^2$ (1000 psi, and long-term stability in use. Cellulose acetate (CA), much used for permselective barriers, exhibits short life, and decay of performance during use attributed to collapse of the porous membrane at the pressures required which results in decrease of water flux. Aliphatic polyamides are more durable, but exhibit poorer permeation properties and salt rejections; hydrophilically substituted such polyamides have water permeability near that of CA, but inferior physical strength.

Aromatic polyamides suitable for such membranes, and membranes thereof, have been described in U.S. Pat. No. 3,567,632 and in German Published Application No. 27 29 847. Membranes of such polymers are more durable than CA and aliphatic polyamides, and have better permeation properties. However, the use of pendant ionic groups in these polymers to raise the hydrophilicity of the polymer and, thus, the water flux also had three negative effects: (1) increased salt passage, (2) decreased hydrolytic stability, and (3) decreased modulus which results in lower collapse pressure for hollow fiber membranes.

Accordingly, it is a principal object of this invention to provide improved membranes for permeation processes, especially reverse osmosis membranes for purification of water.

It is another object to provide novel aromatic polyamides suitable for, and especially adapted for, use in membranes for such permeation processes.

Other objects will appear hereinafter.

SUMMARY OF THE INVENTION

Briefly, according to the present invention, there are provided novel aromatic polyamides based on selected disulfonated aromatic diamines, and permselective membranes thereof.

More specifically, according to the present invention, there is provided a polyamide whose recurring units are

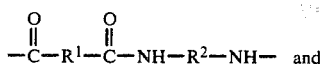
(a)

and

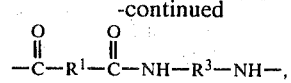
(b)

wherein each of R$^1$ and R$^2$ is independently at least one divalent carbocyclic or heterocyclic aromatic group represented by the symbol Ar$^1$, or at least one divalent group represented by —Ar$^2$—Y—Ar$^3$—, in which Ar$^2$ and Ar$^3$ are each, independently, divalent carbocyclic or heterocyclic aromatic groups, wherein:

Ar$^1$, Ar$^2$ and Ar$^3$ can contain up to two C$_1$–C$_3$ alkoxy, C$_1$–C$_3$ alkyl, amino, hydroxyl, C$_1$–C$_3$ mono- or di-alkyl amino, carboxamide, C$_1$–C$_3$ mono- or di-alkyl carboxamide, halogen, carboxylate, or C$_1$–C$_3$ trialkyl ammonium groups; and Y is —O— (oxygen), —S— (sulfur),

—SO$_2$—, —O—B—O—, —(O—B)$_2$O—,

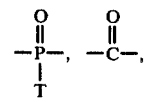

alkylene (straight or branched chain) of 1–4 carbon atoms, —NT—, or a five- or six-membered heterocyclic group having from 1–3 heteroatoms selected from O, N or S; in which T is H, alkyl of 1–6 carbons or phenyl; B is alkylene (straight or branched chain) of 2–4 carbon atoms;

with the proviso that the two linking bonds in all divalent aromatic groups are non-ortho and non-peri to one another and to any linking Y group; and R$^3$ is at least one member of the group consisting of

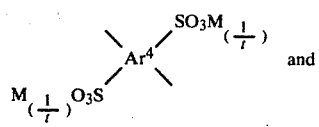
and

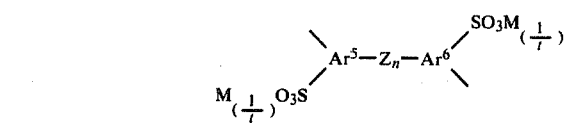

wherein Ar$^4$ is a tetravalent, bi- or tricyclic carbocyclic or heterocyclic group; Ar$^5$ and Ar$^6$ are trivalent carbocyclic or heterocyclic groups, Z is —O— (oxygen), —S— (sulfur), —NT—, —SO$_2$—,

—CH$_2$—, —CH$_2$CH$_2$—, or —CH=CH—, and n is 0 or 1; T is as defined above; the two —SO$_3$M$_{(1/t)}$ groups in R$^3$ being attached to carbon atoms of a said carbocyclic or heterocyclic group, the shortest chain of atoms linking said two —SO$_3$M$_{(1/t)}$ groups in R$^3$ being made up of only C, O, N and S atoms and being at least 4 atoms in length; M is H, alkali metal, alkaline earth metal, transition metal, aluminum, or NQ₄, where each Q is independently is H or C₁ to C₄ alkyl, and t is the valence of M; said (b) units constitute 1 to 35 mol % of the total of said (a) and (b) units, and said (a) and (b) units constitute at least 90 mol % of the recurring units of said polyamide.

There are also provided in accordance with the invention permselective membranes of such aromatic polyamides.

DETAILED DESCRIPTION OF THE INVENTION

The novel polyamides of the invention contain in part moieties derived from unsulfonated aromatic diamines and moieties derived from selected disulfonated aromatic diamines.

Unsulfonated diamines which can be used are those having the structure $H_2N—R^2—NH_2$, where $R^2$ is as defined hereinabove. They are known in the art, e.g., U.S. Pat. No. 3,567,632, such as meta- and para-phenylene diamines, 4,4'-diaminodiphenyl ether, and 4,4'-diaminodiphenylmethane. Meta-phenylene diamine is a preferred non-sulfonated diamine.

The disulfonated diamines are those having the structure $H_2N—R^3—NH_2$, where $R^3$ is at least one member of the group consisting of

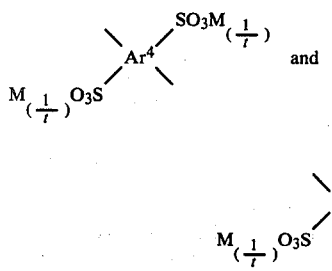

and

wherein $Ar^4$ is a tetravalent, bi- or tricyclic carbocyclic or heterocyclic group; $Ar^5$ and $Ar^6$ are trivalent carbocyclic or heterocyclic groups, Z is —O— (oxygen), —S— (sulfur), —NT—, —SO₂—,

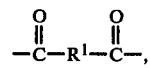

—CH₂—, —CH₂CH₂—, or —CH=CH—, and n is 0 or 1; T is as defined above; the two —SO₃M$_{(1/t)}$ groups in $R^3$ being attached to carbon atoms of a said carbocyclic or heterocyclic group, the shortest chain of atoms linking said two —SO₃M$_{(1/t)}$ groups in $R_3$ being made up of only C, O, N and S atoms and being at least 4 atoms in length; M is H, alkali metal, alkaline earth metal, transition metal, aluminum, or NQ₄, where each Q independently is H or C₁ to C₄ alkyl, and t is the valence of M.

Preferred such disulfonated diamines are those having the structures

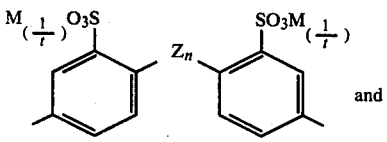

and

-continued

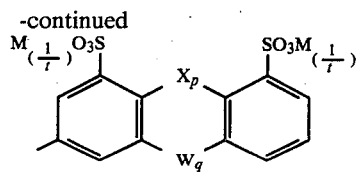

wherein X and W are each independently —O— (oxygen), —NT—, —SO₂—, —CH₂—, —CH₂CH₂—, or —CH=CH—; p is 0 or 1, q is 0 or 1, and p and q are not simultaneously 0; T is H, alkyl of 1-6 carbon atoms or phenyl; and Z and n are as defined above.

The two sulfonate groups are bonded to different rings in such diamines. Typical such disulfonated diamines include 4,4'-diaminodiphenyl ether-2,2'-disulfonic acid, 4,4'-diaminodiphenyl sulfide-2,2'-disulfonic acid, 4,4'-diaminobiphenyl-2,2'-disulfonic acid, and 4,4'-diaminostilbene-2,2'-disulfonic acid. Such compounds are known in the art, and literature references describing their preparation can be found by referring to standard works such as Handbuch der Organische Chemie, Beilstein, published by Springer, Berlin, and Methoden der Organische Chemie, Houben-Weyl, published by Verlag Chemie, Weinheim/Bergstrasse.

The novel polyamides also contain in part moieties derived from aromatic dicarboxylic acids or the corresponding diacyl halides, especially the diacyl chlorides. Such compounds that can be used contain the grouping $$-\overset{O}{\underset{\|}{C}}-R^1-\overset{O}{\underset{\|}{C}}-,$$

where $R^1$ is as defined above. They are also known in the art, e.g., U.S. Pat. No. 3,567,632, such as isophthaloyl chloride, terephthaloyl chloride, naphthalene-1,5-dicarboxylic acid chloride, and diphenyl ether-4,4'-dicarboxylic acid chloride. Preferred such compounds are isophthaloyl chloride and terephthaloyl chloride, especially mixtures thereof, particularly such mixture containing 60-80 mol % of the isophthalic compound and 40-20 mol % of the terephthalic compound, and most especially that containing about 70 mol % of the isophthalic compound and about 30 mol % of the terephthalic compound.

Accordingly, the polyamide of the invention contains recurring units

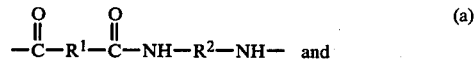 (a)

and

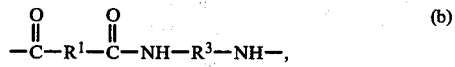 (b)

wherein $R^1$, $R^2$ and $R^3$ are as defined above. The (b) recurring units constitute from 1 to 35 mol %, preferably from 5 to 20 mol %, of the total of the (a) and (b) units. The (a) and (b) units constitute at least 90 mol % of the recurring units of the polyamide, i.e., up to 10 mol % of the recurring units of the polymer can be units of another type, e.g., ester, sulfonamide, etc., without the properties and performance of the polymer being altered to a degree that it cannot be used for permselective membranes. Preferably, however, substantially 100% of the recurring units of the polymer are the indicated (a) and (b) units.

Preferably, each of $R^1$ and $R^2$ is independently selected from the group consisting of

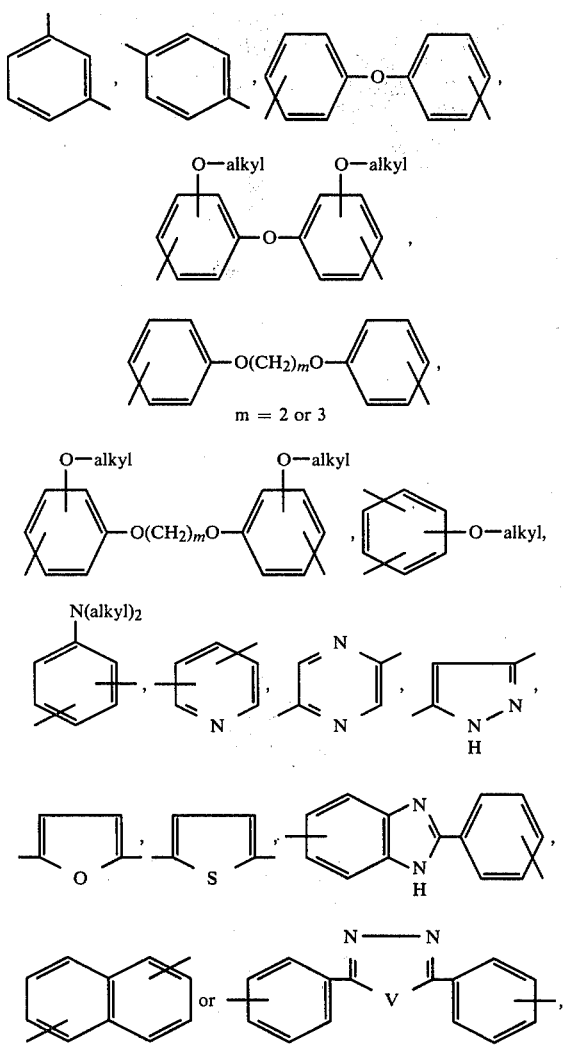

where V is O, S,

N-alkyl, N-phenyl, and mixtures thereof.

The polyamide can suitably be prepared by reaction of the indicated diamines with one or more diacyl halides, the total amount of diamine and total amount of diacyl halide being used in substantially equimolar amounts, in a solvent for the reactants, such as N,N-dimethylacetamide or N-methylpyrrolidone. If desired, an acid acceptor such as triethylamine can be used to neutralize the by-product hydrogen chloride. A nitrogen atmosphere above the reaction mixture can be used if desired. Other preparative methods known in the polyaramide art can also be used.

In order to prepare a permselective membrane of the invention, a casting solution or casting dope of a polyamide of the invention is first prepared. Suitable casting solutions are those made by dissolving the polyamide in a solvent such as N,N-dimethylacetamide, N,N-dimethylformamide or N-methylpyrrolidone which contains a salt such as lithium chloride and/or lithium nitrate that serves to increase the solubility of the polymer in the solvent and/or to increase the permeability of the resulting membrane, and which may or may not contain small amounts of water. Other suitable media for casting solutions are known in the art.

The polyamide solution or dope is then cast or extruded into film form, or extruded into hollow fiber form. After partial removal of the casting solvent by vaporization, the film or hollow fiber is then extracted by treating with a non-solvent for the polymer to replace the balance of the original casting solvent. A suitable and preferred such non-solvent is water. Although the film or hollow fiber is then ready for use as a permselective membrane, it can optionally be treated by annealing, e.g., by heating in water at a temperature of 50° C. to 70° C. for 15 minutes to 20 hours, which treatment aids in extending the time period over which the membrane exhibits permselectivity characteristics at a desirable performance level.

The polyamides of the invention possess properties which make them preeminently useful in the form of membranes for selective permeation processes such as reverse osmosis. They are especially useful in the form of hollow filaments for such processes. They have an improved balance of reverse osmosis properties as compared to prior known membranes, e.g., those made from aromatic polyamides which contain monosulfonated diamines; they have improved selectivity, i.e., increased water permeability but little increase in salt permeability. Furthermore, the polyamides and membranes of the invention have higher moduli at equivalent water flux than those previously known, and many of them are more resistant to hydrolysis than those previously known. These advantages provide a unique combination of desirable membrane properties not possessed by those of the art.

In the polyamides and membranes of the invention, the sulfonate groups can be either in the hydrogen form, i.e., $-SO_3H$ groups, or in the form of alkali metal, alkaline earth metal, transition metal, aluminum, or selected ammonium salts, i.e., $-SO_3M_{(1/t)}$ where M is alkali metal, alkaline earth metal, transition metal, aluminum or $NQ_4$ where each Q independently is H or $C_1$ to $C_4$ alkyl, and t is the valence of M; they can also be in mixed forms, i.e., where the counter ions of the sulfonate $-SO_3^-$ groups is more than one of the indicated salt forming groups and hydrogen.

In the examples to follow, flat membrane performance in reverse osmosis was evaluated in terms of the water permeation coefficient Kw, expressed in units m/s.tPa (meters per second per teraPascal), and the salt rejection, expressed in percent; this evaluation for hyperfiltration properties was carried out in 50-mm-diameter cells using a solution of 1.5 g NaCl/liter water at a pressure of 56 kg/cm² (800 lb/in²). For hollow fibers 50 to 75 fibers 50–100 cm (20–40 inches) in length were enclosed in high pressure nylon tubing (6.4 mm or 0.25 inch inside diameter) and placed under 56 kg/cm² (800 lb/in²) pressure with a solution of 3.5 g NaCl/liter water; the hollow fibers were evaluated in terms of the specific hydraulic permeability expressed in the units m²/s.EPa (square meters per second per exaPascal), and salt rejection, expressed in percent.

In the examples, the inherent viscosities reported were measured on solutions of 50±2 mg of polymer in 10 ml of the indicated solvent at 21±2° C.

To further illustrate the innovative aspects of the present invention, the following examples are provided.

EXAMPLES

EXAMPLE 1

A dry 1-liter resin kettle was charged with m-phenylenediamine (25.00 g; 0.231M), and 4,4'-diaminodiphenyl ether-2,2'-disulfonic acid (9.25 g; 0.0257M) under a nitrogen atmosphere. The mixture was dissolved in 500 ml dimethylacetamide (DMAC) (dried over 4A molecular sieves). A mixture of isophthaloyl chloride (36.51 g; 0.180M) and terephthalaloyl chloride (15.65 g; 0.077M) was added as a molten stream to the vigorously stirred solution (cooled to −25° C.). The addition was completed after 35 minutes at which time the solution temperature was 28° C. After stirring for two additional hours the reaction was quenched in water to precipitate the polymer, and the product was washed with methanol. The inherent viscosity in DMAC was 0.72 dl/g.

EXAMPLE 2

A dry 4-liter resin kettle was charged with m-phenylenediamine (84.90 g; 0.785M), and 4,4'-diaminodiphenyl ether-2,2'-disulfonic acid (36.04 g, 0.10M) under a nitrogen atmosphere. The diamines were dissolved in 400 ml of dry N-methylpyrrolidone and 100 ml of dry triethylamine. A mixture of isophthaloyl chloride (125.78 g, 0.619M) and terephthaloyl chloride (53.91 g, 0.265M) was added as a molten stream to the vigorously stirred solution. After 90% of the combined acid chlorides had been added, the addition was slowed to dropwise and the last 10% added over 30 min. After stirring for 1.5 hours the reaction was quenched by pouring into water. The polymer was washed with dilute aqueous $NH_4OH$, then with methanol, and was then dried. The inherent viscosity in DMAC was 1.2 dl/g.

EXAMPLES 3-1 AND 3-2

For Ex. 3-1, a flat, anisotropic membrane was prepared by casting a solution of polymer prepared from m-phenylenediamine (90 mol %) and 4,4'-diaminodiphenyl ether-2,2'-disulfonic acid (10 mol %) with isophthaloyl chloride (70 mol %) and terephthaloyl chloride (30 mol %) (inherent viscosity 0.72 dl/g in DMAC, 20 g), $H_2O$ (1 g), LiCl (1.2 g), $LiNO_3$ (3.0 g) in dimethylacetamide (DMAC, 80 g), 11 mils thick, on a hot glass plate at 100° C. for 4 min., cooling 90 sec. and quenching in water. The casting solution had been made up by putting the lithium salts and water in the DMAC and heating until the salts dissolved, then the polymer was added and the mixture agitated at 90° C. until the polymer dissolved, and the solution was filtered while hot. After annealing the membrane in water at 70° C. for 30 min. the water flux was determined with 0.15% aqueous NaCl solution at 56 kg/cm² (800 psi) hydrostatic pressure. For Ex. 3-2, a similar membrane was prepared except that the diamine composition was 85 mol % m-phenylenediamine and 15 mol % 4,4'-diaminodiphenyl ether-2,2'-disulfonic acid. The properties of these membranes are summarized in Table 1.

TABLE 1

| | Flat Film Permeation Tests | |
| --- | --- | --- |
| Ex. | Perm. Coeff. Kw (m/s · tPa) | % Salt Rejection |
| 3-1 | 1.67 ± .2 | 98 |
| 3-2 | 3.2 ± .2 | 87 |

EXAMPLE 4 AND COMPARATIVE EXAMPLES A AND B

Hollow fine fibers of the polymer of Example 2 were prepared by spinning a solution of this polymer (200 gms), LiCl (12 g), and $LiNO_3$ (31 g) in dimethylacetamide (280 g) which was evaporated to give a viscosity of 3680 centipoise. These fibers were tested in a mini-permeator with 0.35% aqueous NaCl solution, and gave a specific hydraulic permeability of 46 m²/s.EPa and salt rejection 98%. This is compared in Table 2 to other polymers prepared from similar spinning solutions. The polymer of Comparative Ex. A was prepared from m-phenylene diamine (88 mol %) and 1,3-diaminobenzene-4-sulfonic acid (12 mol %) with isophthaloyl chloride (70 mol %) and terephthaloyl chloride (30 mol %). The polymer of Comparative Ex. B was similar to that of Comparative Ex. A except that the diamine composition was 70 mol % m-phenylene diamine and 30 mol % 1,3-diaminobenzene-4-sulfonic acid.

TABLE 2

| | Hollow Fine Fibers Permeation Tests | | |
| --- | --- | --- | --- |
| Ex. | Specific Hydraulic Permeability (m²/s · EPa) | Salt Rejection (%) | Modulus (megaPascals) |
| 4 | 46 | 98 | 552 |
| A | 10 | 97 | 545 |
| B | 38 | 94 | 400 |

EXAMPLE 5

Polymer was prepared substantially by the method of Example 1 using m-phenylenediamine (70.0 g; 0.647M) and 4,4'-diaminodiphenyl ether-2,2'-disulfonic acid (17.56 g; 0.0487M) with iso-phthaloyl chloride (98.92 g; 0.487M) and tere-phthaloyl chloride (42.39 g; 0.209M). The polymer was neutralized with calcium hydroxide then quenched in water and washed with water. The inherent viscosity was 0.95 dl/g in DMAC.

EXAMPLE 6

Polymer was prepared substantially by the method of Example 2 using m-phenylenediamine (60 g; 0.555M) and 4,4'-diaminodiphenyl ether-2,2'-disulfonic acid (107.65 g; 0.2987M) in reaction with iso-phthaloylchloride (121.31 g; 0.5975M) and tere-phthaloylchloride (51.99 g; 0.2561M), except that no triethylamine was used. Lithium chloride was added to maintain polymer solubility in the amount of 10 g LiCl per 3000 ml N-methylpyrrolidone. After quenching in water the polymer was washed with methanol. The inherent viscosity was 0.93 dl/g in DMAC/LiCl (20 mg LiCl per 10 ml DMAC).

EXAMPLE 7

Polymer was prepared substantially by the method of Example 1 using m-phenylenediamine (30.0 g; 0.277M) and 4,4'-diaminodiphenyl ether-2,2'-disulfonic acid (17.64 g; 0.049M) with iso-phthaloyl chloride (66.26 g;

0.326M). After quenching in water the polymer was washed with methanol. The inherent viscosity was 0.88 dl/g in DMAC.

EXAMPLE 8

Polymer was prepared substantially by the method of Example 2 using 4,4'-diaminodiphenyl ether (20.0 g; 0.0999M) and 4,4'-diaminodiphenyl ether-2,2'disulfonic acid (9.0 g; 0.025M) with iso-phthaloyl chloride (17.75 g; 0.087M) and tere-phthaloyl chloride (7.61 g; 0.0375M). After quenching in water and ammonium hydroxide the polymer was washed with methanol. The inherent viscosity was 1.0 dl/g in DMAC.

EXAMPLE 9

Polymer was prepared substantially by the method of Example 1 using m-phenylenediamine (15.0 g; 0.1387M), 4,4'-diaminodiphenyl ether-2,2'-disulfonic acid (8.33 g; 0.0231M) and 1,5-diaminonaphthalene (10.97 g; 0.0694M) with iso-phthaloyl chloride (32.9 g; 0.162M) and tere-phthaloyl chloride (14.1 g; 0.0694M). After neutralizing with calcium oxide and quenching in water, the polymer was washed with methanol. The inherent viscosity was 1.06 dl/g in DMAC.

EXAMPLE 10

Polymer was prepared substantially by the method of Example 1 using m-phenylenediamine (6.84 g; 0.0623M), 4,4'-diaminodiphenyl ether-2,2'-disulfonic acid (7.58 g; 0.021M) and 1,5-diaminonaphthalene (20.0 g; 0.126M) with iso-phthaloyl chloride (30.1 g; 0.147M) and tere-phthaloyl chloride (12.9 g; 0.063M). After neutralizing with calcium oxide the polymer was quenched in water. The inherent viscosity was 0.81 dl/g in DMAC.

EXAMPLE 11

Polymer was prepared substantially by the method of Example 1 using m-phenylenediamine (20.0 g; 0.185M) and 4,4'-diaminodiphenyl sulfide-2,2'-disulfonic acid (7.73 g; 0.0205M) with iso-phthaloyl chloride (29.21 g; 0.144M) and tere-phthaloyl chloride (12.52 g; 0.062M). After neutralizing the solution with calcium hydroxide and quenching in water, the polymer was washed with methanol. The inherent viscosity was 1.00 dl/g in DMAC.

EXAMPLE 12

Polymer was prepared substantially by the method of Example 2 using m-phenylenediamine (20.0 g; 0.185M), and 4,4'-diaminostilbene-2,2'-disulfonic acid (12.09 g; 0.0326M) with iso-phthaloyl chloride (30.93 g; 0.152M) and tere-phthaloyl chloride (13.25 g; 0.0653M). After quenching in water/ammonium hydroxide, the polymer was washed. The inherent viscosity was 1.2 dl/g in DMAC.

EXAMPLE 13

Polymer was prepared substantially by the method of Example 2 using m-phenylenediamine (20.0 g; 0.185M) and 4,4'-diaminobiphenyl-2,2'-disulfonic acid (7.08 g; 0.0205M) with iso-phthaloyl chloride (29.21 g; 0.144M) and tere-phthaloyl chloride (12.52 g; 0.062M). After quenching in water, the polymer was washed with methanol. The inherent viscosity was 0.5 dl/g in DMAC.

EXAMPLE 14

Polymer was made substantially by the method of Example 1 using m-phenylenediamine (20.0 g; 0.185M) and 4,4'-diaminodiphenylmethane-2,2'-disulfonic acid (7.36 g; 0.0205M) with iso-phthaloyl chloride (29.22 g; 0.144M) and tere-phthaloyl chloride (12.53 g; 0.0617M). After quenching with water, the polymer was washed with methanol. The inherent viscosity was 0.98 dl/g in DMAC.

COMPARATIVE EXAMPLE C

Polymer was prepared for comparison from m-phenylenediamine (61.22 g; 0.566M) and 4,4'-diaminodiphenyl ether-2-sulfonic acid (68.0 g; 0.243M) with iso-phthaloyl chloride (114.92 g; 0.566M) and tere-phthaloyl chloride (49.34 g; 0.243M) in dimethylacetamide (1 liter) and lithium chloride (5 g). After quenching in water, the polymer was washed with methanol. The inherent viscosity was 0.95 dl/g in DMAC.

Membranes of the polymers of Examples 5–14 and Comparative Example C were cast and annealed substantially as in Ex. 3. These membranes performed as shown in Table 3. There was some variability in the permeation characteristics of several membranes prepared from the polymer of Ex. 12, as shown in the Table.

TABLE 3

| | Membrane Tests | |
|---|---|---|
| Ex. | Permeation Coefficient $K_w$ (m/s · tPa) | Salt Rejection (%) |
| 5 | 1 | 99 |
| 6 | 2.3 | 51 |
| 7 | 1.6–1.9 | 79 |
| 8 | 0.6 | 89 |
| 9 | 1.4 | 98 |
| 10 | 1.4 | 96 |
| 11 | 1.8 | 96 |
| 12 a | 1.75 | 94 |
| b | 1.89 | 95 |
| c | 3.9 | 92 |
| 13 | 0.4 | 99 |
| 14 | 0.45–0.6 | 80–92 |
| C | Crumbled after annealing | |

EXAMPLE 15

Polymer was prepared substantially by the method of Example 1 using m-phenylenediamine (30.0 g; 0.277M) and 4,4'-diaminodiphenyl ether-2,2'-disulfonic acid (17.64 g; 0.049M) with tere-phthaloyl chloride (66.26 g; 0.326M). After quenching in water the polymer was washed in methanol. The inherent viscosity was 1.86 dl/g in DMAC/lithium chloride (40 mg LiCl per 10 ml DMAC). This polymer was insoluble in the DMAC/salt composition used for preparing solutions as described in Ex. 3, but can be dissolved using higher amounts of LiCl, e.g., 5 g of polymer in 1 liter of DMAC containing 4 g LiCl.

INDUSTRIAL APPLICABILITY

The polymers of the invention are used in making the permselective membranes of the invention. The membranes are especially useful as reverse osmosis membranes for the preparation of potable water from brackish water and sea water.

I claim:

1. A permselective membrane of a polyamide comprising recurring units

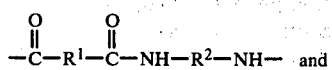 (a)

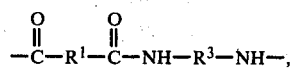 (b)

wherein each of $R^1$ and $R^2$ is independently at least one divalent carbocyclic or heterocyclic aromatic group represented by the symbol $Ar^1$, or at least one divalent group represented by $-Ar^2-Y-Ar^3-$, in which $Ar^2$ and $Ar^3$ are each, independently, divalent carbocyclic aromatic groups, each said divalent heterocyclic group having 1 or 2 heteroatoms selected from the group consisting of O, N and S, wherein $Ar^1$, $Ar^2$ and $Ar^3$ contain zero, one or two $C_1$–$C_3$ alkoxy, $C_1$–$C_3$ alkyl, amino, hydroxyl, $C_1$–$C_3$ mono- or di-alkyl amino, carboxamide, $C_1$–$C_3$ mono- or di-alkyl carboxamide, halogen, carboxylate, or $C_1$–$C_3$ trialkyl ammonium groups; and Y is —O— (oxygen), —S— (sulfur),

—SO$_2$—, —O—B—O—, —(O—B)$_2$O—,

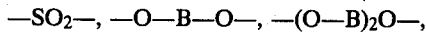

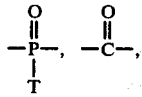

alkylene, straight or branched chain, of 1–4 carbon atoms, —NT—, or a five- or six-membered heterocyclic group having from 1–3 heteroatoms selected from the group consisting of O, N and S; in which T is H, alkyl of 1–6 carbons or phenyl; B is alkylene, straight or branched chain, of 2–4 carbon atoms;

provided that the two linking bonds in all divalent aromatic groups are non-ortho and non-peri to one another and to any linking Y group, and that $R^2$ is unsulfonated; and $R^3$ is at least one member of the group consisting of

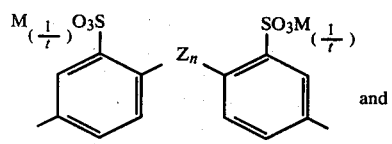

and

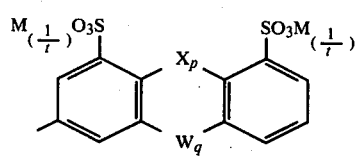

wherein X and W are each independently —O— (oxygen), —NT—, —SO$_2$—, —CH$_2$—, —CH$_2$CH$_2$—, or —CH=CH—; p is 0 or 1, q is 0 or 1, and p and q are not simultaneously 0; T is H, alkyl of 1–6 carbon atoms or phenyl; Z is X, —S— (sulfur) or

and n is 0 or 1; said (b) units constitute 1 to 35 mol % of the total of said (a) and (b) units, and said (a) and (b) units constitute at least 90 mol % of the recurring units of said polyamide.

2. A permselective membrane of claim 1 wherein said (a) and (b) units constitute substantially 100 mol % of the recurring units of said polyamide.

3. A permselective membrane of claim 2 wherein each of $R^1$ and $R^2$ is independently selected from the group consisting of

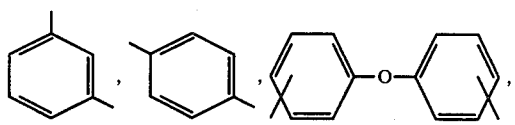

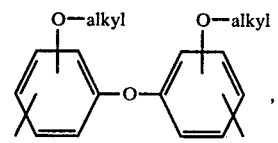

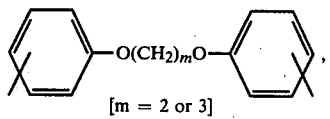

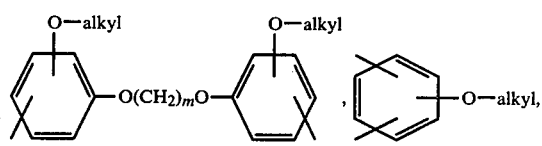

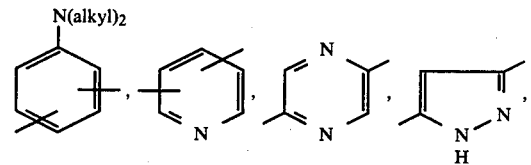

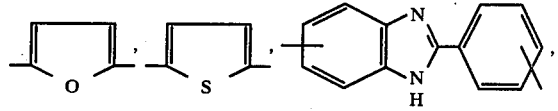

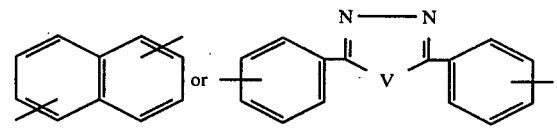

where m is 2 or 3, and V is O, S,

N-alkyl, N-phenyl, or mixtures thereof.

4. A permselective membrane of claim 3 wherein $R^1$ is at least one member of the group consisting of 5. A permselective membrane of claim 3 wherein $R^2$ is

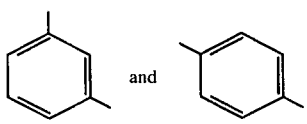

6. A permselective membrane of claim 3 wherein $R^1$ is
a mixture of 60-80 mol %

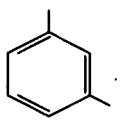

and 40-20 mol %

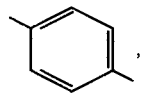

and $R^2$ is

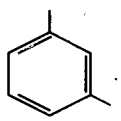

7. A permselective membrane of claim 6 wherein $R^1$ is a mixture of about 70 mol %

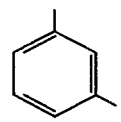

and 30 mol %

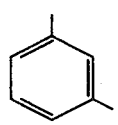

8. A permselective membrane of claim 1, 2, 3 or 6 wherein said shortest chain of atoms linking said two $-SO_3M_{(1/t)}$ groups is 5 to 12 atoms in length.

9. A permselective membrane of claim 3, 4, 5, 6, or 7 wherein $R^3$ is

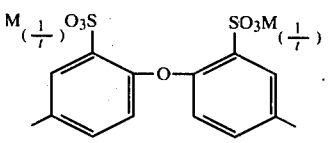

10. A permselective membrane of claim 9 wherein said (b) units are 5 to 20 mol % of the total of said (a) and (b) units.

11. A permselective membrane of claim 10 wherein M is H, Li, Na, K, Ca or Mg, or mixtures thereof.

12. A permselective membrane of claim 11 wherein M is H, Li, Na or K.

13. A permselective membrane of claim 1, 2, 3 or 6 in the form of a hollow fiber.

14. A permselective membrane of claim 10 in the form of a hollow fiber.

15. A permselective membrane of claim 10 in the form of a hollow fiber.

16. A permselective membrane of claim 11 in the form of a hollow fiber.

* * * * *

UNITED STATES PATENT AND TRADEMARK OFFICE
CERTIFICATE OF CORRECTION

PATENT NO. : 4,471,110
DATED : September 11, 1984
INVENTOR(S) : Lance Alan Christell It is certified that error appears in the above—identified patent and that said Letters Patent is hereby corrected as shown below:

Column 4, line 5 and Claim 1, column 11, line 60

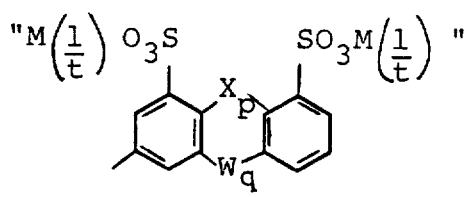

is corrected to read 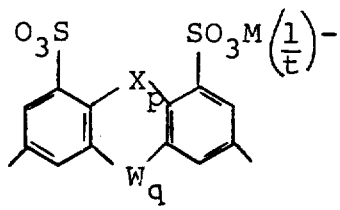

In Claim 3, column 12, lines 55-60 "or" is corrected to read --and--.

Signed and Sealed this

Twenty-sixth Day of March 1985

[SEAL]

Attest:

DONALD J. QUIGG

Attesting Officer      Acting Commissioner of Patents and Trademarks